United States Patent [19]

Mark et al.

[11] 4,111,883

[45] Sep. 5, 1978

[54] PLASTICIZED POLYCARBONATE COMPOSITION

[75] Inventors: Victor Mark, Evansville, Ind.; Phillip Steven Wilson, Louisville, Ky.

[73] Assignee: General Electric Company, Pittsfield, Mass.

[21] Appl. No.: 751,459

[22] Filed: Dec. 16, 1976

[51] Int. Cl.$^2$ ............................................... C08K 5/49
[52] U.S. Cl. ............................................... 260/30.6 R
[58] Field of Search ........................... 260/2 P, 30.6 R

[56] References Cited

U.S. PATENT DOCUMENTS 2,586,312  2/1952  Dishon et al. ........................ 260/2 P
3,883,451  5/1975  Reynard et al. ...................... 260/2 P
3,948,820  4/1976  Reynard et al. ...................... 260/2 P

OTHER PUBLICATIONS

Chem. & Engineering News, Apr. 22, 1968, Phosphonitric Chemistry.
Sears & Darby, SPE Journal, Jul. 1963, pp. 623–631.

*Primary Examiner*—Joseph L. Schofer
*Assistant Examiner*—Peter F. Kulkosky
*Attorney, Agent, or Firm*—William F. Mufatti

[57] ABSTRACT

A plasticized polycarbonate composition comprised in admixture a high molecular weight aromatic carbonate polymer and a minor amount of a phosphazene.

11 Claims, No Drawings

PLASTICIZED POLYCARBONATE COMPOSITION

This invention is directed to a placticized polycarbonate composition comprising in admixture a high molecular weight aromatic carbonate polymer and a minor amount of a phosphazene.

BACKGROUND OF THE INVENTION

Polycarbonate polymers are excellent molding materials as products made therefrom have high impact strength, toughness, high transparency, wide temperature limits (high impact resistance below $-60°$ C. and a UL thermal endurance rating of $115°$ C. with impact), good dimensional stability, high creep resistance and electrical properties which qualify it as sole support for current carrying parts.

Polycarbonates are, however, very difficult to fabricate from melts for the reason that melts thereof have exceptionally high viscosities. Attempts to overcome this difficulty by the incorporation with the polycarbonate of materials known to reduce the viscosity of other resins have very generally been unsuccessful. Many standard viscosity control agents appear to have little or no effect on the viscosity of polycarbonate. Other compounds known to lower the viscosity of resins cause degradation of polycarbonate resins. Some compounds, conventionally employed to improve the workability of polymers, produce an embrittling effect on polycarbonates when they are mixed therewith and the resin is subjected to elevated temperatures as in molding. Still other materials, while satisfactory stiffness modifying agents for other plastics, are too volatile to be incorporated with polycarbonates since polycarbonates have much higher melting points than many other thermoplastics.

DESCRIPTION OF THE INVENTION

It has been surprisingly discovered that, by admixing a minor amount of a phosphazene with a high molecular weight aromatic carbonate polymer, the resultant polycarbonate composition has reduced melt viscosity and does not become brittle or degraded upon molding and thus retains its characteristic high impact strength.

In the practice of this invention, the phosphazene additive is characterized by the following formulae:

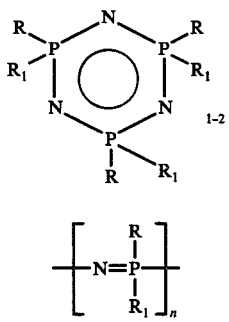

R and $R_1$ are independently selected from the group consisting of $C_1$ to $C_{30}$ alkyl; $C_1$ to $C_{30}$ alkoxy; aryl of 6 to 14 carbon atoms; substituted aryl wherein the substituents are selected from one or more halogen, $C_1$ to $C_{30}$ alkyl or $C_1$ to $C_{30}$ alkoxy; aryloxy of 6 to 14 carbon atoms; substituted aryloxy wherein the substituents are selected from one or more halogen, $C_1$-$C_{30}$ alkyl, and $C_1$-$C_{30}$ alkoxy; alkylthio of 1 to 30 carbon atoms; arylthio of 6 to 14 carbon atoms; substituted arylthio wherein the substituents are selected from one or more halogen, $C_1$ to $C_{30}$ alkyl, and $C_1$ to $C_{30}$ alkoxy; $-NR_2R_3$ wherein $R_2$ and $R_3$ are independently selected from hydrogen; $C_1$ to $C_{30}$ alkyl; aryl of 6 to 14 carbon atoms; substituted aryl wherein the substituents are selected from one or more halogen, $C_1$ to $C_{30}$ alkyl, $C_1$ to $C_{30}$ alkoxy, with the proviso that at least one of $R_2$ or $R_3$ is other than hydrogen; halogen, with the proviso that at least one of R or $R_1$ is other than halogen; $n$ is an integer of from 3 to about 50,000.

The amount of phosphazene employed in the practice of this invention may vary from 0.05 to about 5.0 parts per hundred parts of aromatic carbonate polymer. Preferably, these phosphazenes are employed in amounts of from 0.25 to 2.0 parts per hundred parts of aromatic carbonate polymer.

The phosphazenes of the instant invention are well known in the art and are prepared by well known methods such as those described in H. R. Allcock, "Phosphorus-Nitrogen Compounds", Academic Press (New York), 1972.

In the practice of this invention, the high molecular weight aromatic polycarbonates that can be employed herein are homopolymers and copolymers and mixtures thereof which have an I.V. of 0.40 to 1.0 dl./g. as measured in methylene chloride at $25°$ C. that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(b 3,5,3',5'-tetrahcloro-4,4'-dihydroxydiphenyl) propane, 2,2-(3,5,3', 5'-tetrabromo-4,4'-dihydroxydiphenyl) propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a compolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate copolymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Also included herein are blends of a linear polycarbonate and a branched polycarbonate.

The composition of the instant invention may be prepared by blending the high molecular weight aromatic polycarbonate with the additive by conventional methods.

Obviously, other materials can also be employed with the aromatic carbonate polymer of this invention and include such materials as anti-static agents, pigments, thermal stabilizers, ultraviolet stabilizers, reinforcing fillers and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred parts of an aromatic polycarbonate, prepared from 2,2-bis-(4-hydroxyphenyl) propane and phosgene in the presence of an acid acceptor and a molecular weight regulator and having an intrinsic viscosity of about 0.57, is mixed with the additive listed in the Table by tumbling the ingredients together in a laboratory tumbler. The resulting mixture is then fed to an extruder which is operated at about 265° C., and the extrudate is comminuted into pellets.

The pellets are then fed into a plastometer and the flow rate of the polymer is measured according to ASTM D1238-70, Condition 0. The melt flow rate is set forth in the Table.

Additionally, the pellets are injection molded at about 315° C. into test specimens of about 5 by ½ by ⅛ inch thick. The impact strength of these specimens is then measured according to the Izod test, ASTM D-256. The impact strength is set forth in the Table. The sample labeled CONTROL is the polycarbonate as prepared without additive.

Table

| Additive | Amt. of Additive (Parts per Hundred) | Melt Flow Rate (gr./10 min.) | Impact Strength (Ft.Lbs./In.) |
| --- | --- | --- | --- |
| CONTROL | — | 10.26 | 15.0 |
| 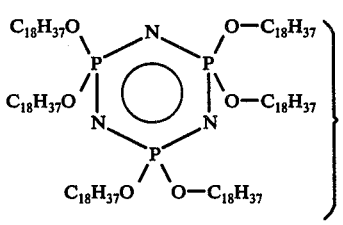 | 0.25<br>0.50 | 20.44<br>25.14 | 15.7<br>14.6 |

Table-continued

| Additive | Amt. of Additive (Parts per Hundred) | Melt Flow Rate (gr./10 min.) | Impact Strength (Ft.Lbs./In.) |
|---|---|---|---|
| 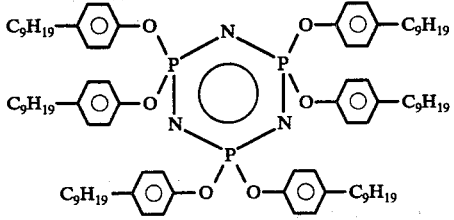 | 0.50 | 14.60 | 16.2 |
| 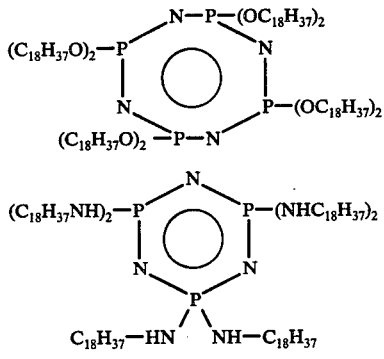 | 0.50 | 15.16 | 16.0 |
| 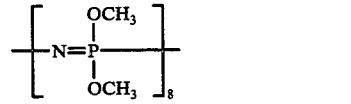 | 0.50 | 16.55 | 16.1 |
| 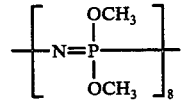 | 0.50 | 14.23 | 16.2 |

It can be seen from the data in the Table that when the instant phosphazene additive is added to a high molecular weight aromatic polycarbonate, the resulting polycarbonate composition has reduced melt viscosity as shown by the higher melt flow rate while retaining impact strength.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A plasticized polycarbonate composition comprising in admixture a high molecular weight aromatic carbonate polymer and a minor amount of a cyclic phosphazene of the following formula:

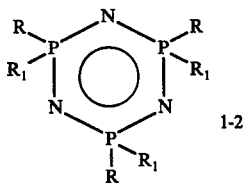

I.

R and $R_1$ are independently selected from the group consisting of $C_1$ to $C_{30}$ alkyl; $C_1$ to $C_{30}$ alkoxy; aryl of 6 to 14 carbon atoms; substituted aryl wherein the substituents are selected from one or more halogen, $C_1$ to $C_{30}$ alkyl or $C_1$ to $C_{30}$ alkoxy; aryloxy of 6 to 14 carbon atoms; substituted aryloxy wherein the substituents are selected from one or more halogen, $C_1$-$C_{30}$ alkyl, and $C_1$-$C_{30}$ alkoxy; alkylthio of 1 to 30 carbon atoms; arylthio of 6 to 14 carbon atoms; substituted arylthio wherein the substituents are selected from one or more halogen, $C_1$ to $C_{30}$ alkyl, and $C_1$ to $C_{30}$ alkoxy; —$NR_2R_3$ wherein $R_2$ and $R_3$ are independently selected from hydrogen; $C_1$ to $C_{30}$ alkyl; aryl of 6 to 14 carbon atoms; substituted aryl wherein the substituents are selected from one or more halogen, $C_1$ to $C_{30}$ alkyl, $C_1$ to $C_{30}$ alkoxy, with the proviso that at least one of $R_2$ or $R_3$ is other than hydrogen; halogen; with the proviso that at least one of R or $R_1$ is other than halogen.

2. The composition of claim 1 wherein the phosphazene is present in an amount of from 0.05 to about 5.0 parts per hundred parts of aromatic carbonate polymer.

3. The composition of claim 1 wherein the aromatic carbonate polymer is derived from bisphenol-A.

4. The composition of claim 1 wherein the aromatic carbonate polymer is a copolymer derived from bisphenol-A and tetrabromo bisphenol-A.

5. The composition of claim 1 wherein the phosphazene of formula I has the following formula:

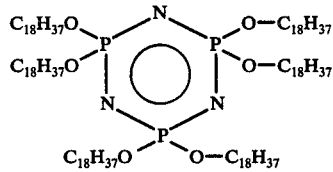

6. The composition of claim 1 wherein the phosphazene of formula I has the following formula:

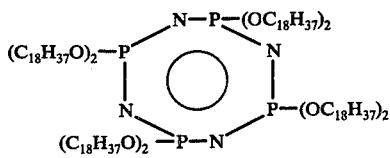

7. A plasticized polycarbonate composition comprising in admixture a high molecular weight aromatic carbonate polymer and a minor amount of a linear polymeric phosphazene of the formula:

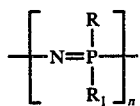

wherein R and $R_1$ are independently selected from the group consisting of $C_1$ to $C_{30}$ alkyl; $C_1$ to $C_{30}$ alkoxy; aryl of 6 to 14 carbon atoms; substituted aryl wherein the substituents are selected from one or more halogen, $C_1$ to $C_{30}$ alkyl or $C_1$ to $C_{30}$ alkoxy; aryloxy of 6 to 14 carbon atoms; substituted aryloxy wherein the substituents are selected from one or more halogen, $C_1$-$C_{30}$ alkyl, and $C_1$-$C_{30}$ alkoxy; alkylthio of 1 to 30 carbon atoms; arylthio of 6 to 14 carbon atoms; substituted arylthio wherein the substituents are selected from one or more halogen, $C_1$ to $C_{30}$ alkyl, and $C_1$ to $C_{30}$ alkoxy; —$NR_2R_3$ wherein $R_2$ and $R_3$ are independently selected from hydrogen; $C_1$ to $C_{30}$ alkyl; aryl of 6 to 14 carbon atoms; substituted aryl wherein the substituents are selected from one or more halogen, $C_1$ to $C_{30}$ alkyl, $C_1$ to $C_{30}$ alkoxy, with the proviso that at least one of $R_2$ or $R_3$ is other than hydrogen; with the proviso that at least one of $R_1$ is other than halogen; $n$ is an integer of from 3 to about 50,000.

8. The composition of claim 7 wherein the phosphazene is present in an amount of from 0.05 to about 5.0 parts per hundred parts of aromatic carbonate polymer.

9. The composition of claim 7 wherein the aromatic carbonate polymer is derived from bisphenol-A.

10. The composition of claim 7 wherein the aromatic carbonate polymer is a copolymer derived from bisphenol-A and tetrabromo bisphenol-A.

11. The composition of claim 7 wherein the phosphazene has the following formula:

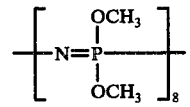

* * * * *

UNITED STATES PATENT AND TRADEMARK OFFICE
CERTIFICATE OF CORRECTION

PATENT NO. : 4,111,883
DATED : September 5, 1978
INVENTOR(S) : Victor Mark and Phillip Steven Wilson It is certified that error appears in the above-identified patent and that said Letters Patent are hereby corrected as shown below:

Column 1, lines 49-55, formula I should read as follows:

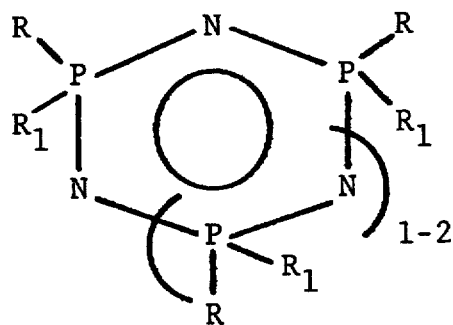

UNITED STATES PATENT AND TRADEMARK OFFICE
CERTIFICATE OF CORRECTION

PATENT NO. : 4,111,883
DATED : September 5, 1978
INVENTOR(S) : Victor Mark and Phillip Steven Wilson It is certified that error appears in the above-identified patent and that said Letters Patent are hereby corrected as shown below:

Column 2, line 36, change "2,2-(b3,5,3',5'...)" to

-- 2,2-(3,5,3',5'...) --.

Column 5, lines 53-58, formula I should read as follows:

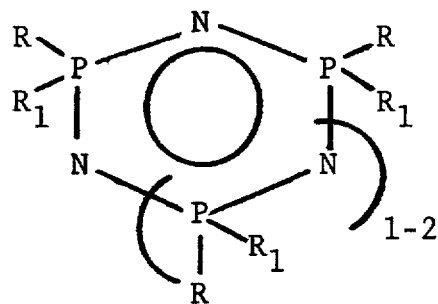

UNITED STATES PATENT AND TRADEMARK OFFICE
CERTIFICATE OF CORRECTION

PATENT NO. : 4,111,883
DATED : September 5, 1978
INVENTOR(S) : Victor Mark and Phillip Steven Wilson It is certified that error appears in the above-identified patent and that said Letters Patent are hereby corrected as shown below:

Column 8, line 8, after "hydrogen;" insert -- halogen; --.

Column 8, line 9, "of $R_1$" should read -- of R or $R_1$ --.

*Signed and Sealed this*

*Twenty-fourth* Day of *July 1979*

[SEAL]

Attest:

LUTRELLE F. PARKER
*Attesting Officer*     *Acting Commissioner of Patents and Trademarks*